United States Patent
Takikawa et al.

(10) Patent No.: US 9,831,720 B2
(45) Date of Patent: Nov. 28, 2017

(54) ELECTROSTATIC-COUPLING CONTACTLESS POWER SUPPLY DEVICE

(71) Applicant: FUJI MACHINE MFG. CO., LTD., Chiryu (JP)

(72) Inventors: Shinji Takikawa, Nagoya (JP); Takahiro Jindo, Anjyo (JP); Naomichi Ishiura, Okazaki (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 195 days.

(21) Appl. No.: 14/430,636

(22) PCT Filed: Sep. 26, 2012

(86) PCT No.: PCT/JP2012/074785
§ 371 (c)(1),
(2) Date: Mar. 24, 2015

(87) PCT Pub. No.: WO2014/049750
PCT Pub. Date: Apr. 3, 2014

(65) Prior Publication Data
US 2015/0249366 A1 Sep. 3, 2015

(51) Int. Cl.
*H02M 3/06* (2006.01)
*H02J 17/00* (2006.01)
*H02J 50/05* (2016.01)

(52) U.S. Cl.
CPC ............. *H02J 17/00* (2013.01); *H02J 50/05* (2016.02)

(58) Field of Classification Search
CPC .................................. H02J 17/00; H02J 50/05
(Continued)

(56) References Cited

U.S. PATENT DOCUMENTS

| | | | |
|---|---|---|---|
| 2006/0176015 A1* | 8/2006 | Bersenev ............. | H02J 7/0044 |
| | | | 320/114 |
| 2007/0139000 A1* | 6/2007 | Kozuma ................ | H02J 5/005 |
| | | | 320/108 |

(Continued)

FOREIGN PATENT DOCUMENTS

| EP | 1 689 062 A1 | 8/2006 |
|---|---|---|
| JP | 2009 284695 | 12/2009 |

(Continued)

OTHER PUBLICATIONS

Extended European Search Report dated Apr. 4, 2016 Application No. 12885421.3.

(Continued)

*Primary Examiner* — Thomas Skibinski
(74) *Attorney, Agent, or Firm* — Oblon, McClelland, Maier & Neustadt, L.L.P.

(57) ABSTRACT

An electrostatic-coupling contactless power supply device includes a power supply electrode and a high-frequency power source circuit that are provided on a fixing portion, and a power receiving electrode and a power receiving circuit that are provided on a movable portion. The power supply electrode is formed of a plurality of segment electrodes which are arranged in a line in a moving direction of the movable portion and to which power is individually supplied from the high-frequency power source circuit. A plurality of switches are connected between the high-frequency power source circuit and the segment electrodes, respectively, and are opened and closed independently of one another. A current detecting circuit individually detects segment currents flowing in the respective segment electrodes; and a switch controller controls the switches so that only a part of the plurality of switches are closed.

8 Claims, 5 Drawing Sheets

(58) Field of Classification Search
USPC .......... 307/109, 104; 320/107, 108, 112–115
See application file for complete search history.

(56) References Cited

U.S. PATENT DOCUMENTS

| | | | |
|---|---|---|---|
| 2010/0073181 A1* | 3/2010 | Ootaka | ................... B60R 25/00 340/667 |
| 2011/0234019 A1 | 9/2011 | Camurati et al. | |
| 2014/0103716 A1 | 4/2014 | Camurati et al. | |

FOREIGN PATENT DOCUMENTS

| | | |
|---|---|---|
| JP | 2009 284696 | 12/2009 |
| WO | WO 2011/043074 A1 | 4/2011 |

OTHER PUBLICATIONS

International Search Report dated Nov. 6, 2012 in PCT/JP12/074785 filed Sep. 26, 2012.
Office Action dated Sep. 29, 2016 in Chinese Patent Application No. 201280075963.7 (English translation only).

\* cited by examiner

[FIG. 2]
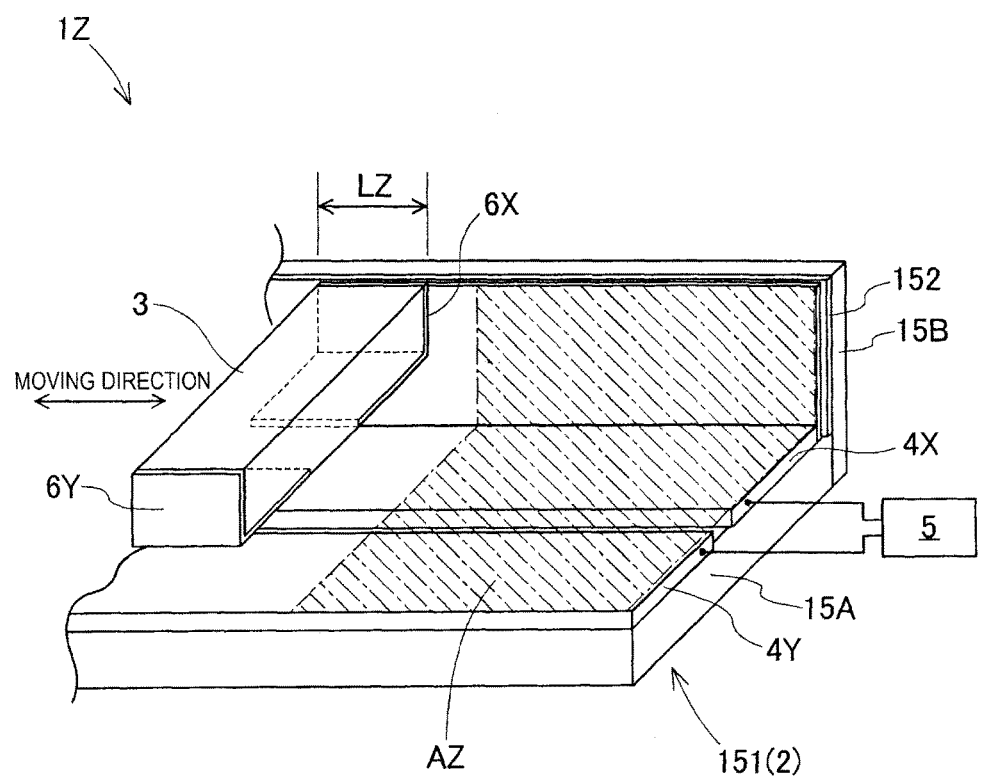

[FIG. 3]
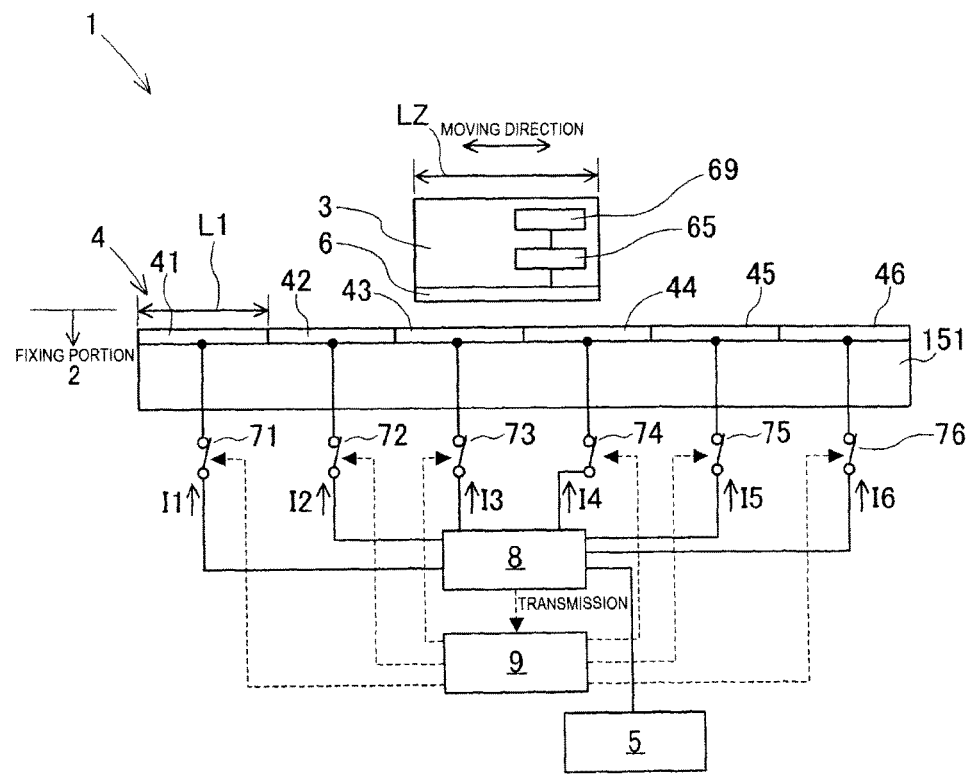

[FIG. 4]
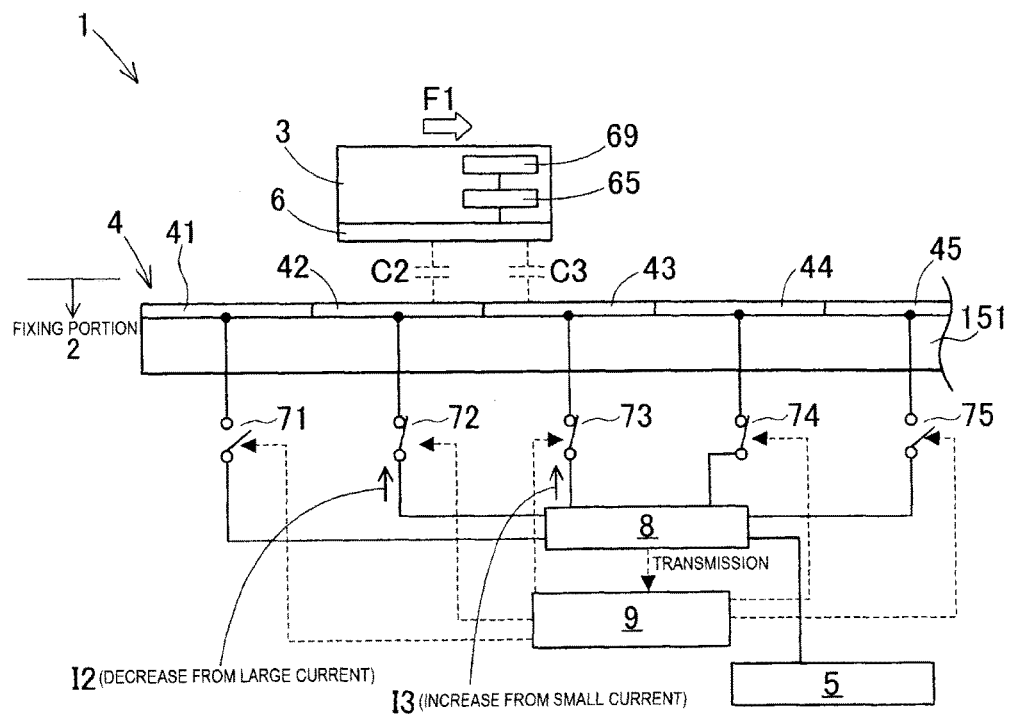
[FIG. 5]
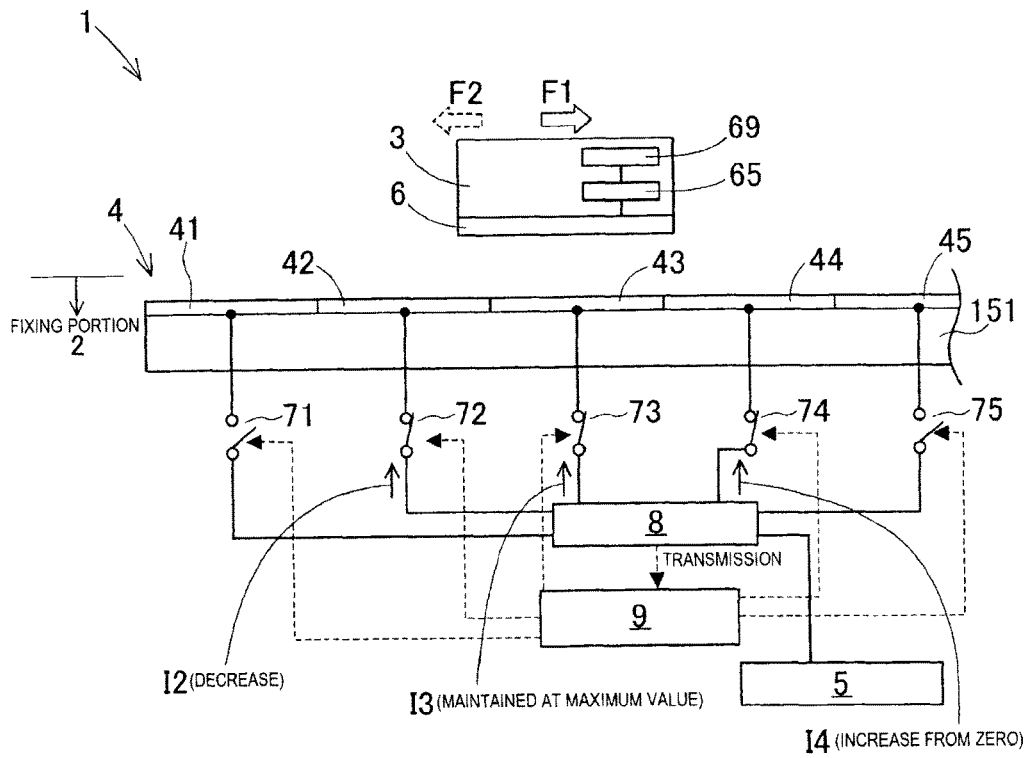

[FIG. 6]
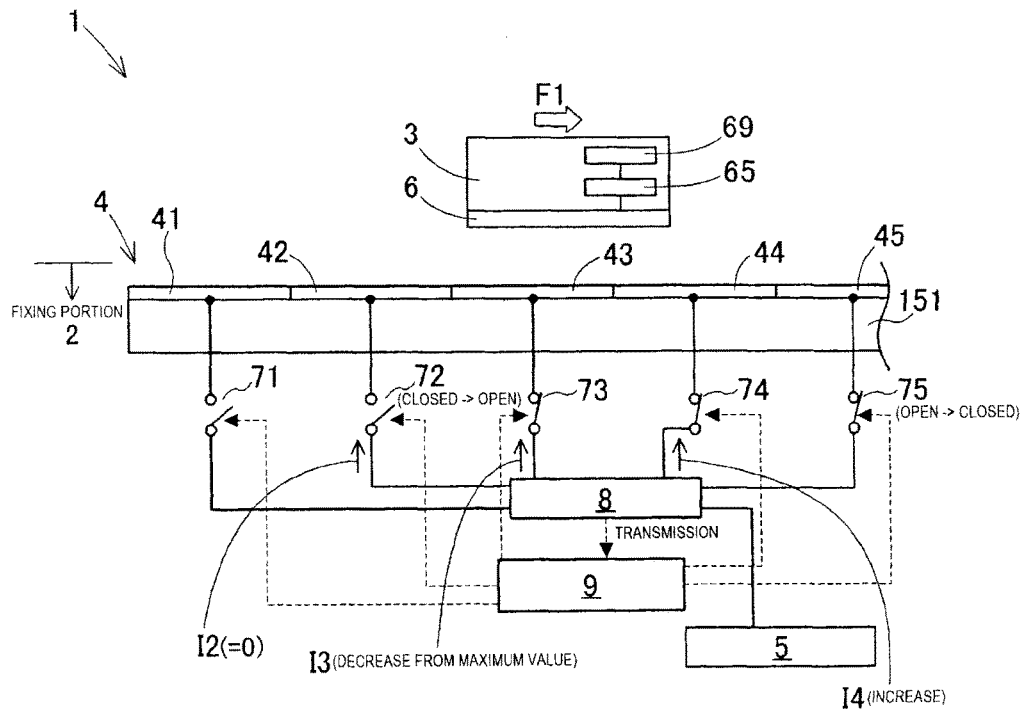
[FIG. 7]
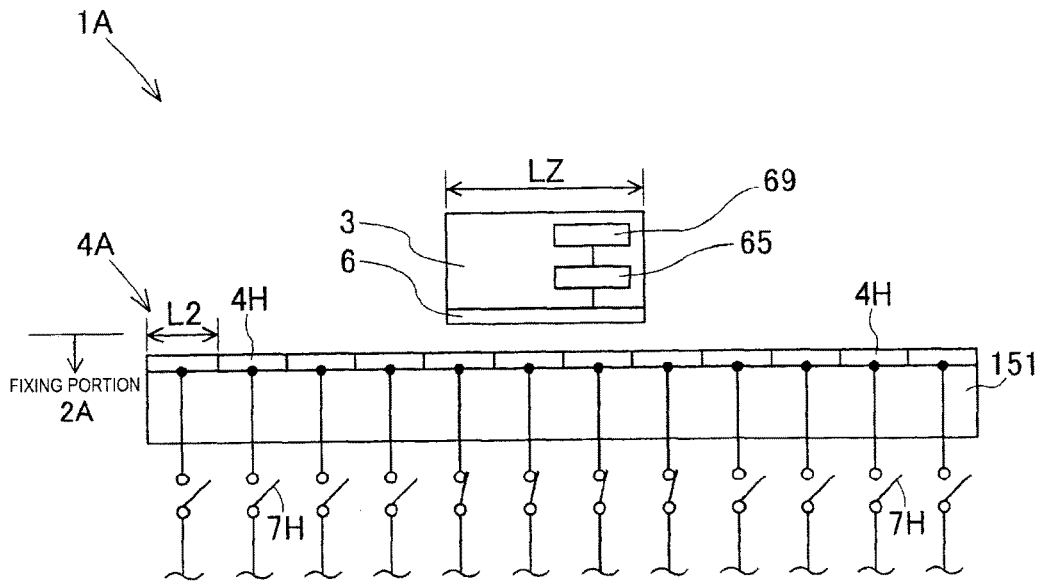

ELECTROSTATIC-COUPLING CONTACTLESS POWER SUPPLY DEVICE

TECHNICAL FIELD

The present invention relates to a contactless power supply device that supplies power to an electrical load provided on a movable portion from a fixing portion in a contactless manner, and more particularly, to an electrostatic-coupling contactless power supply device in which electrodes are disposed so as to be spaced apart from each other and face each other.

BACKGROUND ART

There are a solder printer, a component mounting machine, a reflow machine, a substrate inspection machine, and the like as substrate working machines that produce a substrate on which a plurality of components are mounted. There are many cases in which these machines are connected to each other by a substrate carrying device to construct a substrate production line. Most of these substrate working machines include movable portions that move above a substrate and perform predetermined work, and can use linear motor devices as one kind of means of driving the movable portions. Generally, a linear motor device includes a track member in which N poles and S poles of a plurality of magnets are alternately arranged in a line along a moving direction, and a movable portion that includes an armature including a core and coils. In the related art, a deformable power supply cable has been used to supply power to an electrical load that is provided on the movable portion including a linear motor device. Further, the application of a contactless power supply device has been proposed in recent years to solve an adverse effect, such as an increase of a transporting weight due to a power supply cable or a risk of disconnection caused by metal fatigue.

An electromagnetic induction system using a coil has been widely used in the related art as the system of a contactless power supply device. However, an electrostatic-coupling system in which a capacitor is formed by electrodes, which face each other so as to be spaced apart from each other, has been used in recent years, and a magnetic field resonance system and the like are also examined. The use of a contactless power supply device is not limited to a substrate working machine, and is widespread for industrial machines for other industries, home appliances, and the like. Technical examples of an electromagnetic induction type contactless power supply device are disclosed in PTL 1 and PTL 2.

An insulation type power supply device for a moving body of PTL 1 includes a plurality of primary coils that are arranged in a line on the ground, a secondary coil that is mounted on a moving body, a plurality of switches that are disposed between the respective primary coils and a three-phase AC power source, and an overlapping sensor that detects a state in which magnetic poles of the primary coils overlap a magnetic pole of the secondary coil. Further, when the overlapping sensor detects the overlap of both the magnetic poles, the switches are closed and current flows in the primary coils. When the overlapping sensor detects the deviation of both the magnetic poles, the switches are opened. Accordingly, only when the primary coil and the secondary coil face each other, current flows in the primary coil. Therefore, efficient operation can be achieved by the suppression of the generation of leaked magnetic flux emitted to a space.

An insulation type power supply device for a moving body of PTL 2 includes multiple primary coils that are connected in series to an AC power supply device of which an output voltage can be adjusted, a secondary coil that is mounted on a moving body, a voltmeter that measures a voltage between terminals of each primary coil, a plurality of contactors that short-circuit between the terminals of each primary coil, and a controller that controls the opening/closing of each contactor. Further, the controller determines a specific primary coil, to which the secondary coil is close, from a signal of a voltage between the terminals, and makes the contactors of the other primary coils short-circuit so that current flows only in the specific primary coil. Accordingly, it is possible to detect the primary coil, which faces the secondary coil, without using a special detector, and to reduce unnecessary power consumption without supplying power to the primary coils that do not face the secondary coil.

Further, in PTL 2, it is preferable that the output voltage of the AC power supply device is suppressed to a low level during the monitoring of the approach of the secondary coil and the output voltage is made high when electromagnetic induction occurs in the secondary coil. Accordingly, since the contactors are opened and closed while the output voltage is low, a spark is suppressed. Therefore, it is possible to prevent degradation.

CITATION LIST

Patent Literature

PTL 1: JP-A-2009-284695
PTL 2: JP-A-2009-284696

SUMMARY OF INVENTION

Technical Problem

Incidentally, the devices of PTL 1 and PTL 2 are preferable in terms of a fact that power supply efficiency can be improved since current flows only in a specific primary coil. However, since an object to which the devices are applied is limited to an electromagnetic induction system, the devices cannot be used in an electrostatic-coupling contactless power supply device.

Moreover, since the overlapping sensor (position detection sensor) detecting the position of the secondary coil, that is, the moving body is required in PTL 1, costs increase that much. In this regard, it is possible to suppress an increase in costs by using a voltmeter in PTL 2 instead of the overlapping sensor. However, since the number of the series-connected primary coils in which current flows is changed in PTL 2, the output voltage of the AC power supply device needs to be adjusted. In addition, the output voltage also needs to be adjusted to suppress a spark. For this reason, since the control of the output voltage of the AC power supply device becomes difficult and complicated, power supply efficiency tends to be lowered and the costs of the AC power supply device also increase.

The invention has been made in consideration of the problem in the related art, and an object of the invention is to provide an electrostatic-coupling contactless power supply device that can improve power supply efficiency in comparison with the related art in contactless power supply using electrodes.

Solution to Problem

According to an invention of claim 1, an electrostatic-coupling contactless power supply device, which solves the above-mentioned object, includes a power supply electrode that is provided on a fixing portion, a high-frequency power source circuit that supplies high-frequency power to the power supply electrode, a power receiving electrode that is provided on a movable portion movably mounted on the fixing portion, faces the power supply electrode so as to be spaced apart from the power supply electrode, and receives high-frequency power in a contactless manner, and a power receiving circuit that converts the high-frequency power received by the power receiving electrode and supplies the converted high-frequency power to an electrical load provided on the movable portion. The power supply electrode is formed of a plurality of segment electrodes which are arranged in a line in a moving direction of the movable portion and to which power is individually supplied from the high-frequency power source circuit. The electrostatic-coupling contactless power supply device further includes a plurality of switches that are connected between the high-frequency power source circuit and the segment electrodes, respectively, and are opened and closed independently of one another, a current detecting circuit that individually detects segment currents flowing in the respective segment electrodes, and a switch controller that controls the switches on the basis of at least one of a magnitude and an increase/decrease state of each of the segment currents changing with the movement of the movable portion so that only a part of the plurality of switches are closed.

According to an invention of claim 2, in claim 1, the switch controller determines a travelling direction of the movable portion on the basis of the increase/decrease states of the segment currents in the plurality of segment electrodes in which the segment currents flow, and closes specific switches corresponding to the plurality of segment electrodes in which the segment currents flow and the segment electrodes provided in the travelling direction and opens the other switches except for the specific switches.

According to an invention of claim 3, in claim 2, the length of each of the segment electrodes in the moving direction of the movable portion is shorter than the length of the power receiving electrode and a distance between the segment electrodes is short; and the switch controller determines the travelling direction of the movable portion on the basis of the increase/decrease states of the segment currents in two or more segment electrodes in which the segment currents flow, and closes a total of three or more specific switches corresponding to two or more segment electrodes in which the segment currents flow and one segment electrode provided in the travelling direction.

According to an invention of claim 4, in claim 1, the switch controller closes specific switches corresponding to the segment electrode in which the segment current increases and the segment electrodes provided on both sides thereof, and opens the other switches except for the specific switches.

According to an invention of claim 5, in claim 4, the length of each of the segment electrodes in the moving direction of the movable portion is shorter than the length of the power receiving electrode and a distance between the segment electrodes is short, and the switch controller closes a total of three or more specific switches corresponding to one or more segment electrodes in which the segment current increases and one segment electrode provided on each of both sides thereof.

According to an invention of claim 6, in claim 3 or 5, the length of each of the segment electrodes in the moving direction of the movable portion is in a range that exceeds 0.5 times the length of the power receiving electrode and is smaller than the length of the power receiving electrode, and the switch controller closes a total of three specific switches.

According to an invention of claim 7, in any one of claims 1 to 6, at least one of when the device is started and when the switches to be closed during the operation of the device are uncertain, the switch controller provisionally closes all of the switches once, the current detecting circuit individually detects the segment currents flowing in all of the segment electrodes, and the switch controller then determines the switches to be closed.

Advantageous Effects of Invention

In the contactless power supply device according to an invention of claim 1, the power supply electrode is divided into the plurality of segment electrodes, the segment electrodes are arranged in a line in the moving direction of the movable portion, and power is individually supplied to the segment electrodes. Accordingly, when segment current flows only in the segment electrode that faces the power receiving electrode of the movable portion, sufficient power supply performance is obtained. Further, the segment electrode, which faces the power receiving electrode, and the segment electrode, which will face the power receiving electrode next time, can be recognized from at least one of the magnitude and the increase/decrease state of the segment current. Accordingly, when the switches are controlled so that only a part of the plurality of switches is closed and the output voltage of the high-frequency power source circuit is applied, an output voltage is not applied to the segment electrode distant from the power receiving electrode. Accordingly, it is possible to improve power supply efficiency in comparison with the related art by suppressing power loss that is caused by the leakage of an electric field from the segment electrodes.

Further, since an independent position detection sensor, which detects the current positions of the movable portion and the power receiving electrode, is not required, it is possible to suppress an increase in costs in comparison with a structure that includes an overlapping sensor in PTL 1. Furthermore, the plurality of segment electrodes are connected to the high-frequency power source circuit in parallel, an output voltage is individually applied to the segment electrodes, and there is no concern about a spark in the capacitors formed by the electrodes facing each other so as to be spaced apart from each other unlike in a coil. Accordingly, the output voltage of the high-frequency power source circuit is substantially constant, which is preferable. Therefore, the control of an output voltage is easy in comparison with the AC power supply device of PTL 2 and the cost of the high-frequency power source circuit is reduced.

In the invention of claim 2, the switch controller determines the travelling direction of the movable portion on the basis of the increase/decrease states of the segment currents flowing in the plurality of segment electrodes, and determines the segment electrodes, to which the output voltage is to be applied. Accordingly, a voltage is reliably applied to the segment electrode that faces the power receiving electrode and the segment electrode that will face the power receiving electrode next time, and a voltage is not applied to the other segment electrodes that deviate from the power receiving electrode. Therefore, it is possible to improve power supply efficiency in comparison with the related art.

In the invention of claim 3, each of the segment electrodes is shorter than the power receiving electrode, so that the power receiving electrode always faces two or more segment electrodes. Accordingly, it is easy to determine the travelling direction of the movable portion on the basis of the increase/decrease states of the segment currents. Further, since a voltage may be applied to one segment electrode provided in the travelling direction of the movable portion in addition to the segment electrode in which the segment current currently flows, it is possible to reduce the number of segment electrodes to which a voltage is applied. Therefore, it is possible to significantly improve power supply efficiency.

In the invention of claim 4, the output voltage is applied to the segment electrode in which the segment current increases and the segment electrodes provided on both sides thereof. Accordingly, a voltage is reliably applied to the segment electrode that faces the power receiving electrode and the segment electrode that will face the power receiving electrode next time, and a voltage is not applied to the other segment electrodes that deviate from the power receiving electrode. Therefore, it is possible to improve power supply efficiency in comparison with the related art.

In the invention of claim 5, each of the segment electrodes is shorter than the power receiving electrode. Accordingly, the power receiving electrode always faces two or more segment electrodes, and a segment current changes substantially proportional to the size of the area of the electrodes facing each other. For this reason, a voltage may be applied to the segment electrode in which the segment current increases and one segment electrode provided on each of both sides thereof. Accordingly, since it is possible to reduce the number of segment electrodes to which a voltage is applied, it is possible to significantly improve power supply efficiency.

In the invention of claim 6, the length of the segment electrode is in a range that exceeds 0.5 times the length of the power receiving electrode and is smaller than the length of the power receiving electrode. Accordingly, when the power receiving electrode faces two or three segment electrodes and a voltage is applied to three segment electrodes, sufficient power supply performance is obtained. Therefore, since it is possible to make the number of segment electrodes, to which a voltage is applied, be a minimum of 3, it is possible to significantly improve power supply efficiency.

In the invention of claim 7, even though the position of the movable portion is uncertain at the time of the start of the device, it is possible to recognize the position of the movable portion by individually detecting the segment currents flowing in all of the segment electrodes while provisionally closing the switches once. Accordingly, it is possible to properly achieve subsequent power supply control. Further, even when the switches to be closed become uncertain due to a certain cause during the operation of the device, it is possible to properly achieve subsequent power supply control by performing the same operation and recognition as those at the time of the start of the device.

BRIEF DESCRIPTION OF DRAWINGS

FIG. 2 is a view conceptually illustrating the structure of a general electrostatic-coupling contactless power supply device.

FIG. 3 is a single-line diagram schematically showing the entire configuration of the electrostatic-coupling contactless power supply device according to the first embodiment of the invention.

FIG. 4 is a diagram illustrating the operation and the action of the electrostatic-coupling contactless power supply device according to the first embodiment.

FIG. 5 is a diagram illustrating the operation and the action subsequent to FIG. 4.

FIG. 6 is a diagram illustrating the operation and the action subsequent to FIG. 5.

FIG. 7 is a diagram schematically illustrating a part of the configuration of an electrostatic-coupling contactless power supply device according to a third embodiment.

DESCRIPTION OF EMBODIMENTS

Figure 1:
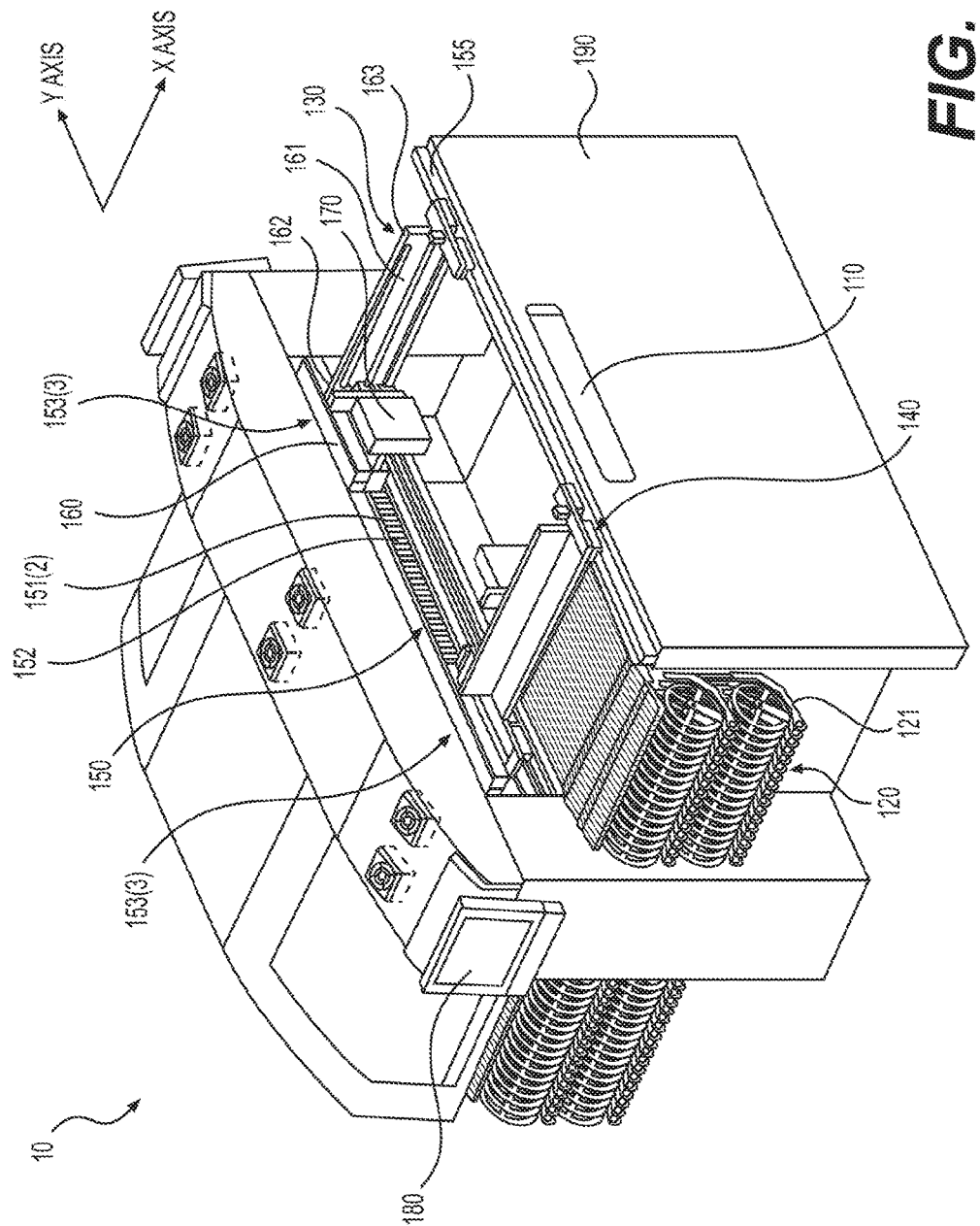
FIG. 1 is a perspective view showing the entire structure of a component mounting machine to which an electrostatic-coupling contactless power supply device according to a first embodiment of the invention can be applied.

First, a component mounting machine 10 to which the invention can be applied will be described with reference to FIG. 1. FIG. 1 is a perspective view showing the entire structure of the component mounting machine 10 to which an electrostatic-coupling contactless power supply device 1 according to a first embodiment of the invention can be applied. The component mounting machine 10 is an apparatus for mounting a plurality of components on a substrate, and includes two sets of component mounting units that have the same structure and are substantially symmetrically disposed. Here, a component mounting unit from which a front right cover of FIG. 1 has been removed will be described as an example. Meanwhile, the width direction of the component mounting machine 10, which is directed to the front right side from the rear left side in FIG. 1, is referred to as an X-axis direction, and the longitudinal direction of the component mounting machine 10 is referred to as a Y-axis direction.

The component mounting machine 10 has a structure in which a substrate carrying device 110, component supply devices 120, two component transfer devices 130 and 140, and the like are assembled on a machine base 190. The substrate carrying device 110 is provided so as to cross the vicinity of a longitudinal middle portion of the component mounting machine 10 in the X-axis direction. The substrate carrying device 110 includes a carrying conveyor (not shown), and carries a substrate in the X-axis direction. Further, the substrate carrying device 110 includes a clamp unit (not shown), and fixes and holds a substrate at a predetermined mounting position. The component supply devices 120 are provided at a front portion (a front left side in FIG. 1) and a rear portion (not shown) of the component mounting machine 10 in the longitudinal direction. The component supply devices 120 include a plurality of cassette-type feeders 121, and are adapted to continuously supply components to the two component transfer devices 130 and 140 from carrier tapes that are set in the respective feeders 121.

The two component transfer devices 130 and 140 are so-called XY robot-type devices that can move in the X-axis direction and the Y-axis direction. The two component transfer devices 130 and 140 are provided at the front and rear portions of the component mounting machine 10 in the longitudinal direction so as to face each other. Each of the component transfer devices 130 and 140 includes a linear motor device 150 for movement in the Y-axis direction.

The linear motor device 150 includes a track member 151 and an auxiliary rail 155 that are common to the two component transfer devices 130 and 140, and linear movable portions 153 that are provided for the two component transfer devices 130 and 140, respectively. The track member 151 corresponds to a part of a fixing portion 2 of the invention, and extends in the Y-axis direction that is a moving direction of the linear movable portion 153. The track member 151 includes a bottom 15A that is disposed below the linear movable portion 153 and sides 15B that are disposed on both sides of the linear movable portion 153, and is formed in the shape of a groove that is opened upward. A plurality of magnets 152 are arranged in a line in the Y-axis direction on the inner surfaces of the sides 15B, which face each other, of the track member 151.

The linear movable portions 153 are movably mounted on the track member 151. The linear movable portion 153 corresponds to a movable portion 3 of the invention, and includes a movable body portion 160, an X-axis rail 161, a mounting head 170, and the like. The movable body portion 160 extends in the Y-axis direction, and armatures, which generate a propulsive force against the magnets 152 of the track member 151, are provided on both side surfaces of the movable body portion 160. The X-axis rail 161 extends from the movable body portion 160 in the X-axis direction. One end 162 of the X-axis rail 161 is coupled with the movable body portion 160, and the other end 163 thereof is movably mounted on the auxiliary rail 155. Accordingly, the X-axis rail 161 is adapted to move integrally with the movable body portion 160 in the Y-axis direction.

The component mounting head 170 is mounted on the X-axis rail 161 and is adapted to move in the X-axis direction. A suction nozzle (not shown) is provided at the lower end of the component mounting head 170. The suction nozzle sucks and picks up a component from the component supply device 120 by using negative pressure, and mounts the component on the substrate that is held at the mounting position. A ball screw feed mechanism (not shown), which is provided on the X-axis rail 161, includes an X-axis motor that rotationally drives a ball screw, and drives the component mounting head 170 in the X-axis direction. A plurality of electrical components, which are provided on the linear movable portion 153 (the movable portion 3) to operate the component mounting head 170, correspond to an electrical load in the invention. Meanwhile, the armatures of the linear motor device 150 are also included in the electrical load.

In addition, the component mounting machine 10 includes a display setting device 180 that exchanges information with an operator, a camera (not shown) that takes an image of a substrate or a component, and the like.

Next, a general electrostatic-coupling contactless power supply device 1Z will be described with reference to FIG. 2. FIG. 2 is a view conceptually illustrating the structure of the general electrostatic-coupling contactless power supply device 1Z. The horizontal direction in FIG. 2 is a moving direction of the movable portion 3, and is an extending direction of the track member 151 provided on the fixing portion 2. Further, the front side of the track member 151 is not shown in FIG. 2. As shown in FIG. 2, the track member 151 is provided with two power supply electrodes 4X and 4Y. The two power supply electrodes 4X and 4Y have shapes symmetrical to each other, and are formed of metal plates or the like so as to have an L-shaped cross-section. One side of each of the two L-shaped power supply electrodes 4X and 4Y is disposed so as to come into contact with the bottom 15A of the track member 151. The other sides of the two L-shaped power supply electrodes 4X and 4Y are disposed parallel to the magnets 152 of the sides 15B of the track member 151. Furthermore, the two power supply electrodes 4X and 4Y are provided over substantially the entire length of the track member 151 (the entire length of the track member in the horizontal direction of FIG. 2).

A high-frequency power source circuit 5 is provided on the fixing portion 2. The high-frequency power source circuit 5 supplies high-frequency power in the range of, for example, 100 kHz to several MHz between the two power supply electrodes 4X and 4Y. Since an output voltage and an output frequency of the high-frequency power source circuit 5 can be adjusted, a sine wave, a rectangular wave, or the like can be exemplified as the waveform of the output voltage.

Further, as shown in FIG. 2, the movable portion 3 is provided with two power receiving electrodes 6X and 6Y. The two power receiving electrodes 6X and 6Y have shapes symmetrical to each other, and are formed of metal plates or the like so as to have an L-shaped cross-section. The two power receiving electrodes 6X and 6Y are provided over substantially the entire length LZ of the movable portion 3, but are much shorter than the power supply electrodes 4X and 4Y. The two power receiving electrodes 6X and 6Y are disposed so as to be parallel to the power supply electrodes 4X and 4Y provided on the fixing portion 2, face the power supply electrodes 4X and 4Y, and be spaced apart from the power supply electrodes 4X and 4Y, respectively. Accordingly, capacitors are formed between the power supply electrodes 4X and 4Y and the power receiving electrodes 6X and 6Y, so that electrostatic-coupling contactless power supply is performed.

Furthermore, a power receiving circuit and an electrical load (not shown) are mounted on the movable portion 3. The two power receiving electrodes 6X and 6Y are electrically connected to the input side of the power receiving circuit, and an output side of the power receiving circuit is electrically connected to the electrical load. The power receiving circuit converts high-frequency power, which is received by the power receiving electrodes 6X and 6Y, and supplies converted high-frequency power to the electrical load. The power receiving circuit is configured in accordance with the operating voltage specifications of the electrical load. For example, a full-wave rectification circuit, an inverter circuit, or the like is used as the power receiving circuit.

Further, a series resonant circuit is generally used for the improvement of power supply capacity and power supply efficiency. That is, an inductor for resonance is inserted into and connected to the high-frequency power source circuit 5 or the power receiving circuit so that series resonance occurs at the output frequency of the high-frequency power source circuit 5. In general, a coil is used as the inductor for resonance. The inductor for resonance is connected in series to the capacitors that are formed by the power supply electrodes 4X and 4Y and the power receiving electrodes 6X and 6Y. The inductance value of the inductor for resonance is determined so that the imaginary part of impedance at the output frequency of the series resonant circuit is zero. Furthermore, the output frequency of the high-frequency power source circuit 5 is also variably adjusted so as to be equal to a resonant frequency.

As described above, the two power receiving electrodes 6X and 6Y are much shorter than the power supply electrodes 4X and 4Y in the general electrostatic-coupling contactless power supply device 1Z. Accordingly, the range of the electrode surface areas of the power supply electrodes 4X and 4Y facing the power receiving electrodes 6X and 6Y is limited. Further, since an electric field is wastefully emitted from a range AZ of the surfaces of the power supply electrodes 4X and 4Y that do not face the power receiving electrodes 6X and 6Y as shown in FIG. 2 by a one-dot chain line, power loss is generated. Accordingly, in the invention, the power supply electrodes 4X and 4Y are divided into a plurality of segment electrodes and a voltage is applied to only a part of the segment electrodes.

FIG. 3 is a single-line diagram schematically showing the entire configuration of the electrostatic-coupling contactless power supply device 1 according to the first embodiment of the invention. In FIG. 3, a reciprocating electrical conductor is shown by one line and only one of a set of two electrodes and the like is shown. Further, the horizontal direction in FIG. 3 is the moving direction of the movable portion 3. The electrostatic-coupling contactless power supply device 1 is a device that supplies power to an electrical load 69 mounted on the movable portion 3 without contact by an electrostatic coupling method. The electrostatic-coupling contactless power supply device 1 includes: a power supply electrode 4 formed of a plurality of segment electrodes 41 to 46, a high-frequency power source circuit 5, a plurality of switches 71 to 76, a current detecting circuit 8, and a switch controller 9 that are provided on the fixing portion 2; and a power receiving electrode 6 and a power receiving circuit 65 that are provided on the movable portion 3.

The power supply electrode 4 provided on the fixing portion 2 is formed of a plurality of segment electrodes 41 to 46 which are arranged in a line in the moving direction of the movable portion 3 and to which power is individually supplied from the high-frequency power source circuit 5. Each of the power supply electrodes 4X and 4Y shown in FIG. 2 is divided into substantially the same pieces of which the number is six, so that six segment electrodes 41 to 46 are formed. Meanwhile, the number of divided pieces is not limited to six. The respective segment electrodes 41 to 46 are disposed so that a distance between the segment electrodes can be reduced as much as possible as long as electrical insulation between the segment electrodes can be ensured. In FIG. 3, for convenience sake, a left end portion of the power supply electrode 4 is referred to as a first segment electrode 41, the other segment electrodes are numbered in turn, and a right end portion of the power supply electrode 4 is referred to as a sixth segment electrode 46.

The plurality of switches 71 to 76 are connected between the high-frequency power source circuit 5 and the segment electrodes 41 to 46, respectively, and are adapted to be capable of being opened and closed independently of one another. Accordingly, the number of the switches 71 to 76 is equal to the number of the segment electrodes 41 to 46, and the plurality of switches are referred to as first to sixth switches 71 to 76 for convenience sake. When the switches 71 to 76 are closed, the output voltage of the high-frequency power source circuit 5 is applied to each of the segment electrodes 41 to 46. If the power receiving electrode 6 faces each of the segment electrodes 41 to 46 at this time, segment currents I1 to I6 flow and contactless power supply is performed. If the power receiving electrode 6 does not face each of the segment electrodes 41 to 46 at this time, an electric field is wastefully emitted and leaks. For this reason, power loss is generated. Electromagnetic contactors, or the like can be used as the switches 71 to 76.

The current detecting circuit 8 individually detects first to sixth segment currents I1 to I6 that flow in the first to sixth segment electrodes 41 to 46, respectively. The current detecting circuit 8 can include current detecting units and a current reading unit (not shown). The current detecting units are individually provided between the high-frequency power source circuit 5 and the respective switches 71 to 76, and output detection signals corresponding to the magnitudes of the segment currents I1 to I6. A current transformer, a shunt resistor, a Hall element, and the like can be exemplified as the current detecting unit. The current reading unit converts the detection signals, which are output from the current detecting units, into current information and transmits the current information to the switch controller 9.

The switch controller 9 controls the switches on the basis of the magnitudes and increase/decrease states of the respective segment currents I1 to I6 changing with the movement of the movable portion 3 so that only a part of the plurality of switches 71 to 76 are closed. For example, a sequencer (programmable controller), which is formed of a relay circuit adapted to be electronically controlled, can be used as the switch controller 9. Detailed functions of the switch controller 9 will be described in detail below together with the operation and the action thereof.

The power receiving electrode 6 provided on the movable portion 3 can be formed in the same shape as the power receiving electrodes 6X and 6Y shown in FIG. 2. Here, a length L1 of each of the segment electrodes 41 to 46 in the moving direction is in a range that exceeds 0.5 times a length LZ of the power receiving electrode 6 and is smaller than the length LZ. FIG. 3 exemplifies a case in which the length L1 of each of the segment electrodes 41 to 46 is about 0.7 times the length LZ of the power receiving electrode 6. However, the invention does not limit this range, and the length L1 of each of the segment electrodes 41 to 46 may be smaller than 0.5 times the length LZ of the power receiving electrode 6 or exceed the length LZ.

An input side of the power receiving circuit 65 is electrically connected to the power receiving electrode 6, and an output side thereof is electrically connected to the electrical load 69. The power receiving circuit 65 converts high-frequency power, which is received by the power receiving electrode 6, and supplies the converted high-frequency power to the electrical load 69. The power receiving circuit 65 is configured in accordance with the operating voltage specifications of the electrical load 69, and can be formed of, for example, a full-wave rectification circuit, an inverter circuit, or the like.

Next, the operation and the action of the electrostatic-coupling contactless power supply device 1 according to the first embodiment having the above-mentioned structure will be described. FIG. 4 is a diagram illustrating the operation and the action of the electrostatic-coupling contactless power supply device 1 according to the first embodiment. Further, FIG. 5 is a diagram illustrating the operation and the action subsequent to FIG. 4, and FIG. 6 is a diagram illustrating the operation and the action subsequent to FIG. 5.

When the device 1 is started, the switch controller 9 provisionally closes all of the switches 71 to 76 once. Here, the current position and the travelling direction of the movable portion 3 exemplified in FIG. 4 are assumed. That is, it is assumed the current position at which a portion, which is greater than half, of the surface of the power receiving electrode 6 of the movable portion 3 faces the second segment electrode 42 and the rest thereof faces the third segment electrode 43. Further, the travel of the movable portion 3 in a rightward direction is assumed as shown by an arrow F1.

In FIG. 4, the capacitance of each of capacitors, which are formed by the segment electrodes 41 to 46 and the power receiving electrode 6, is substantially proportional to the area of the electrodes facing each other. For this reason, capacitance C2 of the capacitor, which is formed by the second segment electrode 42 and the power receiving electrode 6, is large, and capacitance C3 of the capacitor, which is formed by the third segment electrode 43 and the power receiving electrode 6, is smaller than the capacitance C2. Furthermore, capacitance is hardly generated on the other segment electrodes, that is, the first segment electrode 41 and the fourth to sixth segment electrodes 44 to 46. In addition, the magnitude of each of the segment currents I1 to I6 is substantially proportional to the magnitude of capacitance. Accordingly, the second segment current I2 detected by the current detecting circuit 8 is large; the third segment current I3 is small; and the other segment currents, that is, the first segment current I1 and the fourth to sixth segment currents I4, I5, and I6 are substantially zero. Therefore, the switch controller 9 can recognize the positions of the movable portion 3 and the power receiving electrode 6.

When the movable portion 3 travels slightly in a rightward direction F1, the area of the surface of the second segment electrode 42 facing the power receiving electrode 6 is reduced and the area of the surface of the third segment electrode 43 facing the power receiving electrode 6 is increased. Accordingly, the second segment current I2 decreases and the third segment current I3 increases. Therefore, the switch controller 9 can determine the travel of the movable portion 3 in the rightward direction F1. Immediately after determining, the switch controller 9 maintains the closed states of a total of three of second to fourth switches 72 to 74 corresponding to the second and third segment electrodes 42 and 43 in which the segment currents flow and the fourth segment electrode provided in the travelling direction, and opens the other switches, that is, the first switch 71, the fifth switch 75, and the sixth switch 76.

After the movable portion 3 travels further in the rightward direction F1 and a right end of the movable portion 3 reaches the fourth segment electrode 44 as shown in FIG. 5, the power receiving electrode 6 faces three segment electrodes, that is, the second segment electrode 42, the third segment electrode 43, and the fourth segment electrode 44. At this time, the second segment current I2 decreases, the third segment current I3 is maintained at the maximum value, and the fourth segment current I4 starts to increase from zero.

After the movable portion 3 travels further from FIG. 5 in the rightward direction F1 and a left end of the movable portion 3 deviates from the second segment electrode 42 as shown in FIG. 6, the power receiving electrode 6 faces two segment electrodes, that is, the third and fourth segment electrodes 43 and 44. At this time, the second segment current I2 becomes zero, the third segment current I3 starts to decrease from the maximum value, and the fourth segment current I4 increases. Accordingly, the switch controller 9 can determine the travel of the movable portion 3 in the rightward direction F1, opens the switch 72 corresponding to the second segment electrode 42, and closes the switch 75 corresponding to the fifth electrode 45.

When the movable portion 3 travels further from FIG. 6 in the rightward direction F1 and the left end of the movable portion 3 deviates from the third segment electrode 43, the third segment current I3 decreases to zero. Accordingly, the switch controller 9 opens the switch 73 corresponding to the third segment electrode 43 and closes the switch 76 corresponding to the sixth segment electrode 46.

Further, when the travelling direction is changed, the increase/decrease states of the segment currents I1 to I6 change. For example, when the travelling direction is reversed to a leftward direction F2 from the rightward direction F1 at the current position of the movable portion 3 shown in FIG. 5, the state of the second segment current I2 is changed to an increase state from a decrease state and the state of the fourth segment current I4 is changed to a decrease state from an increase state. Accordingly, the switch controller 9 can unerringly determine the travel of the movable portion 3 in the leftward direction F2. The switch controller 9 determines the travelling direction of the movable portion 3, and can properly achieve power supply control by always closing three adjacent switches and opening the other three switches.

Meanwhile, even when the switches 71 to 76 to be closed become uncertain due to a cause, such as the missing of the segment currents, in particular, I1 to I6, during the operation of the device 1, the switch controller 9 provisionally closes all of the switches once and performs the same operation and recognition as those at the time of the start of the device 1.

According to the electrostatic-coupling contactless power supply device 1 of the first embodiment, the power supply electrode 4 is divided into six segment electrodes 41 to 46, the segment electrodes are arranged in a line in the moving direction of the movable portion 3, and power is individually supplied to the segment electrodes. Further, since the length of each of the segment electrodes 41 to 46 is in a range that exceeds 0.5 times the length of the power receiving electrode 6 and is smaller than the length of the power receiving electrode 6, the power receiving electrode 6 faces two or three segment electrodes. Accordingly, when a voltage is applied to three segment electrodes, sufficient power supply performance is obtained.

Further, the switch controller 9 determines the travelling direction of the movable portion 3 on the basis of the increase/decrease states of the segment currents I1 to I6 flowing in the plurality of segment electrodes 41 to 46, and determines the segment electrodes, to which a voltage is to be applied, among the segment electrodes 41 to 46. Accordingly, a voltage is reliably applied to the segment electrode that faces the power receiving electrode 6 and the segment electrode that will face the power receiving electrode 6 next time, and a voltage is not applied to the other segment electrodes that deviate from the power receiving electrode 6. Therefore, it is possible to significantly improve power supply efficiency in comparison with the related art by suppressing power loss that is caused by the leakage of an electric field from the segment electrodes 41 to 46. Specifically, since the number of segment electrodes, to which a voltage is to be applied, among the segment electrodes 41 to 46 is 3 that is half of 6, that is, the number of all segment electrodes, power loss caused by the leakage of an electric field becomes about half or less of power loss in the related art.

Furthermore, since an independent position detection sensor, which detects the current positions of the movable portion 3 and the power receiving electrode 6, is not required, it is possible to suppress an increase in costs. Moreover, the six segment electrodes 41 to 46 are connected to the high-frequency power source circuit 5 in parallel, an output voltage is individually applied to the segment electrodes, and there is no concern about a spark in the capacitors formed by the electrodes 41 to 46 unlike in a coil. Accordingly, the output voltage of the high-frequency power source circuit 5 is substantially constant, which is preferable. Therefore, the control of an output voltage is easy and the cost of the high-frequency power source circuit 5 is reduced.

Moreover, when the position of the movable portion 3 is uncertain at the time of the start of the device 1, the switch controller recognizes the position of the movable portion 3 by individually detecting the segment currents I1 to I6 flowing in all of the segment electrodes 41 to 46 while provisionally closing all of the switches 71 to 76 once. Accordingly, it is possible to properly achieve subsequent power supply control. Further, even when the switches 71 to 76 to be closed become uncertain due to a cause, such as the absence of the segment currents I1 to I6, during the operation of the device 1, it is possible to properly achieve subsequent power supply control by performing the same operation and recognition as those at the time of the start of the device 1.

Next, an electrostatic-coupling contactless power supply device according to a second embodiment will be described. The second embodiment is the same as the first embodiment in terms of the entire configuration of the device, and is different from the first embodiment in terms of only a power supply control method of a switch controller 9. That is, the switch controller 9 of the second embodiment closes specific switches corresponding to a segment electrode of which a segment current increases and segment electrodes provided on both sides of the segment electrode, and opens the other switches except for the specific switches.

When a condition where the length of each of the segment electrodes 41 to 46 is in a range exceeding 0.5 times the length of the power receiving electrode 6 and smaller than the length of the power receiving electrode 6 is satisfied, the power receiving electrode 6 always faces two or three segment electrodes as shown in FIGS. 4 to 6. Accordingly, when the power receiving electrode 6 faces three segment electrodes, that is, the second to fourth segment electrodes 42 to 44 as shown in FIG. 5, a voltage only has to be applied to a total of three segment electrodes including the third segment electrode 43 of which a segment current I3 has the maximum value and which is positioned in the middle and the second and fourth segment electrodes 42 and 44 that are positioned on both sides of the third segment electrode 43.

Further, when the power receiving electrode 6 faces two segment electrodes as shown in FIGS. 4 and 6, a voltage is applied to a total of three segment electrodes including the segment electrode in which a larger segment current flows and which is positioned in the middle and two segment electrodes that are positioned on both sides of the segment electrode. Then, when the movable portion 3 travels and the magnitudes of the segment currents of the two segment electrodes are inverted, the switch controller 9 only has to open and close the switches 71 to 76 and control the switches so that the segment current of the segment electrode positioned in the middle is always the largest among the segment currents of three segment electrodes to which a voltage is applied.

In the second embodiment, it is possible to properly achieve power supply control by only comparing the magnitudes of the segment currents even though the travelling direction of the movable portion 3 is not determined. Since the effects of the second embodiment are the same as those of the first embodiment, the description thereof will be omitted.

Next, an electrostatic-coupling contactless power supply device 1A according to a third embodiment will be described. FIG. 7 is a diagram schematically illustrating a part of the configuration of the electrostatic-coupling contactless power supply device 1A according to the third embodiment. In the third embodiment, a power supply electrode 4A provided on a fixing portion 2A is formed of segment electrodes 4H having a length L2(=L1/2), which is half of the length of the segment electrode of the first embodiment, and twelve segment electrodes 4H, of which the number is double the number of the segment electrodes of the first embodiment, are arranged in a line. Further, twelve switches 7H are provided in accordance with the number of the segment electrodes 4H. Since the configuration of other portions of the fixing portion 2A is the same as that of the first embodiment, the high-frequency power source circuit, the current detecting circuit, and the switch controller are not shown in FIG. 7. Meanwhile, a power receiving electrode 6, a power receiving circuit 65, and an electrical load 69 of a movable portion 3 are the same as those of the first embodiment.

In the third embodiment, the length L2 of the segment electrode 4H is about 0.35 times the length LZ of the power receiving electrode 6. That is, since the length LZ of the power receiving electrode 6 is slightly smaller than three times the length L2 of the segment electrode 4H, the power receiving electrode 6 always faces three or four segment electrodes 4H so as to be spaced apart from the segment electrodes. For this reason, when the travelling direction of the movable portion 3 is determined and power supply control is performed as in the first embodiment, it is possible to maintain sufficient power supply performance by closing a total of four switches 7H and applying a voltage to four segment electrodes 4H.

Accordingly, since the number of segment electrodes H to which a voltage is to be applied is 4 that is a third of 12, that is, the number of all segment electrodes, power loss caused by the leakage of an electric field becomes about a third or less of power loss in the related art. An effect of improving power supply efficiency is more significant than that of the first embodiment. When the segment electrode 4H is made small in this way, power supply efficiency is improved that much. However, since a plurality of switches 7H are required that much, the current detecting circuit becomes complicated.

Meanwhile, various kinds of configuration other than the configuration described in the first embodiment can be employed as the internal configuration of the current detecting circuit 8 and the switch controller 9. Further, a method of controlling the opening/closing of the switches 71 to 76 and 7H, which is performed by the switch controller 9, can also be appropriately modified. For example, the travel speed of the movable portion 3 is calculated from the time rate of change of a segment current, a timing where the movable portion 3 reaches the next segment electrode is estimated, and a switch may be controlled so that the state of a switch is changed to a closed state from an open state at the timing. The invention may have other various modifications and applications.

INDUSTRIAL APPLICABILITY

The electrostatic-coupling contactless power supply device of the invention is not limited to a substrate working machine including a component mounting machine, and can also be widely used for industrial machines for other industries that include movable portions and require contactless power supply. In addition, the electrostatic-coupling contactless power supply device can also be used for the supply of power to a traveling electric train in a contactless manner without using a pantograph or the like, the supply of power to a traveling electric automobile from a road surface in a contactless manner, and the like.

REFERENCE SIGNS LIST 1, 1A, 1Z: electrostatic-coupling contactless power supply device
2: fixing portion 3: movable portion
4, 4X, 4Y: power supply electrode
41 to 46: first to sixth segment electrode
4H: segment electrode 5: high-frequency power source circuit
6, 6X, 6Y: power receiving electrode
65: power receiving circuit 69: electrical load
71 to 76: first to sixth switches 7H: switch
8: current detecting circuit
9: switch controller
10: component mounting machine
110: substrate carrying device 120: component supply device
130, 140: component transfer device 150: linear motor device
151: track member 160: movable body portion
161: X-axis rail
170: mounting head 180: display setting device
190: machine base

The invention claimed is:

1. An electrostatic-coupling contactless power supply device comprising:
   a power supply electrode that is provided on a track portion, the track portion including a plurality of magnets arranged in a line;
   a high-frequency power source circuit that supplies high-frequency power to the power supply electrode;
   a movable portion that moves linearly relative to the track portion, the movable portion including an armature that generates a propulsive force against the magnets;
   a power receiving electrode that is provided on the movable portion, that faces the power supply electrode so as to be spaced apart from the power supply electrode, and that receives high-frequency power in a contactless manner; and
   a power receiving circuit that converts the high-frequency power received by the power receiving electrode and supplies the converted high-frequency power to an electrical load provided on the movable portion, the electrical load including the armature, the power supply electrode being formed of a plurality of segment electrodes which are arranged in a line in a moving direction of the movable portion and to which power is individually supplied from the high-frequency power source circuit,
   the electrostatic-coupling contactless power supply device further comprising:
   a plurality of switches that are connected between the high-frequency power source circuit and the segment electrodes, respectively, and are opened and closed independently of one another;
   a current detecting circuit that individually detects segment currents flowing in the respective segment electrodes; and
   a switch controller that controls the switches on the basis of at least one of a magnitude and an increase/decrease state of each of the segment currents changing with the movement of the movable portion so that only a part of the plurality of switches are closed.

2. The electrostatic-coupling contactless power supply device according to claim 1,
   wherein the switch controller determines a travelling direction of the movable portion on the basis of the increase/decrease states of the segment currents in the plurality of segment electrodes in which the segment currents flow, and closes specific switches corresponding to the plurality of segment electrodes in which the segment currents flow and the segment electrodes provided in the travelling direction and opens the other switches except for the specific switches.

3. The electrostatic-coupling contactless power supply device according to claim 2,
   wherein the length of each of the segment electrodes in the moving direction of the movable portion is shorter than the length of the power receiving electrode, and a distance between the segment electrodes is short, and
   the switch controller determines the travelling direction of the movable portion on the basis of the increase/decrease states of the segment currents in two or more segment electrodes in which the segment currents flow, and closes a total of three or more specific switches corresponding to two or more segment electrodes in which the segment currents flow and one segment electrode provided in the travelling direction.

4. The electrostatic-coupling contactless power supply device according to claim 3,
   wherein the length of each of the segment electrodes in the moving direction of the movable portion is in a range that exceeds 0.5 times the length of the power receiving electrode and is smaller than the length of the power receiving electrode, and
   the switch controller closes a total of three specific switches.

5. The electrostatic-coupling contactless power supply device according to claim 1,
   wherein the switch controller closes specific switches corresponding to the segment electrode in which the segment current increases and the segment electrodes provided on both sides thereof, and opens the other switches except for the specific switches.

6. The electrostatic-coupling contactless power supply device according to claim 5,
   wherein the length of each of the segment electrodes in the moving direction of the movable portion is shorter than the length of the power receiving electrode, and a distance between the segment electrodes is short, and
   the switch controller closes a total of three or more specific switches corresponding to one or more segment electrodes in which the segment current increases and one segment electrode provided on each of both sides thereof.

7. The electrostatic-coupling contactless power supply device according to claim 1,
   wherein at least one of when the device is started and when the switches to be closed during the operation of the device are uncertain, the switch controller provisionally closes all of the switches once, the current detecting circuit individually detects the segment currents flowing in all of the segment electrodes, and the switch controller then determines the switches to be closed.

8. The electro-static coupling contactless power supply device according to claim 1,
   wherein the current detecting circuit converts detection signals of the currents flowing in the respective segment electrodes into current information and transmits the current information to the switch controller.

* * * * *